United States Patent [19]

Pees et al.

[11] Patent Number: 5,706,920
[45] Date of Patent: Jan. 13, 1998

[54] MONOTUBE DAMPER

[75] Inventors: James Mitchell Pees, Centerville; George Thomas Claude, Bellbrook; Joel Ray Wells, Huber Heights; Claude H. Cheatham, West Carrollton, all of Ohio

[73] Assignee: General Motors Corporation, Detroit, Mich.

[21] Appl. No.: 698,412

[22] Filed: Aug. 15, 1996

[51] Int. Cl.⁶ .................................................. F16F 9/36
[52] U.S. Cl. ............................................. 188/322.17
[58] Field of Search .............................. 188/269, 314, 188/322.16, 322.17–322.19, 322.22; 267/64.15, 64.16

[56] References Cited

U.S. PATENT DOCUMENTS

| | | | |
|---|---|---|---|
| 4,750,594 | 6/1988 | Siemann et al. | 188/322.17 |
| 5,178,243 | 1/1993 | Hamada et al. | 188/322.17 |
| 5,224,573 | 7/1993 | Amemiya et al. | 188/322.17 |
| 5,533,598 | 7/1996 | Adrian et al. | 188/322.17 |

FOREIGN PATENT DOCUMENTS 2688280  9/1993  France ............................. 188/322.16

*Primary Examiner*—Josie Ballato
*Attorney, Agent, or Firm*—Jeffrey A. Sedlar

[57] ABSTRACT

A suspension damper of the monotube gas charged shock type includes mating piston and rod guide assemblies and mating piston and gas cup assemblies wherein the extension and compression travel of the damper is maximized. The piston includes an annular skirt with a lower rebound cutoff element. The rod guide assembly includes twin spaced apart bushing assemblies providing lateral support to the piston rod, a lower annular leg and an upper rebound cutoff element. When the damper is in a fully extended position, the lower annular leg is received within the upper rebound cutoff element and the upper rebound cutoff element is received within the annular skirt of the piston assembly.

19 Claims, 3 Drawing Sheets

MONOTUBE DAMPER

TECHNICAL FIELD

The present invention relates to suspension dampers and more particularly, to a monotube gas charged damper assembly.

BACKGROUND OF THE INVENTION

Monotube gas charged dampers are conventionally known wherein a piston with a connected piston rod is slidably contained in a fluid filled tube with a separate piston called a gas cup slidably carried in the tube on the opposite side of the piston from the rod. The gas cup separates a compressible gas charge from the fluid. It has been found that monotube gas charged dampers exhibit desirable performance characteristics when used in some suspension assemblies.

However, the use of gas charged monotube dampers has been limited to only certain suspension assemblies among those where such use is desirable. For example, when a damper is used in a front wheel drive vehicle, it is generally carried above the axle and below the hood or fender line. This limits the overall length of the damper. For viability, the travel length of a damper must be acceptably long as determined by the vehicle's suspension requirements. With known monotube gas charged dampers, the gas charge and gas cup introduce an undesirable amount of inactive length to the assembly, thereby reducing active travel length of the damper. This creates difficulties in packaging the damper within the suspension and in some cases, precludes the use of a monotube gas charged damper.

A further complicating factor in providing an acceptable travel length arises due to increased load carrying requirements placed on dampers. To sufficiently carry higher loads, a damper's structural rod is of an increased diameter. Therefore, the amount of oil displaced when the rod enters the tube during compression is greater. Displacement of more fluid necessitates greater volumetric compensation needs, requires greater linear movement of the gas cup and necessarily increases the overall length of the damper assembly.

SUMMARY OF THE INVENTION

It is an aspect of the present invention to provide a monotube, gas-charged suspension damper of increased active length. According to this aspect a monotube damper is provided which includes a piston slidably and sealingly positioned within a cylinder tube. The piston separates the cylinder tube into compression and extension chambers. A piston rod is attached to the piston and extends through the extension chamber and out of the cylinder tube. A rod guide supports the piston rod at the area surrounding its exit from the cylinder tube. A gas cup is positioned in the cylinder tube on the opposite side of the piston from the rod guide which separates a gas chamber from the compression chamber.

The rod guide body and the piston body are provided as stamping with a shape that permits them to mate together in an overlapping fashion as the damper approaches full extension. Therefore, the active travel length of the suspension damper is maximized. In addition, the rod guide utilizes a pair of independent bushings to maximize the lateral support provided to the piston rod which has increased extendability.

Preferably, the rod seal is included as two individual components on opposite sides of the outer bushing in order to provide a more secure sealing arrangement for the damper. The rod guide is also preferably designed to be self-aligning during closure of the top end of the cylinder tube. A conventional means is provided to introduce a gas charge into the cylinder tube between its bottom closed end and the inserted gas cup. The gas cup is designed in a fashion to additionally mate with the piston assembly in an overlapping fashion.

The active travel length of the suspension damper is maximized by designing the piston to overlap in a mating fashion with the rod guide assembly and gas cup. This is achieved while providing a suspension damper of a relatively simplified assembly and of a relatively low cost.

DESCRIPTION OF THE PREFERRED EMBODIMENT

Figure 1:
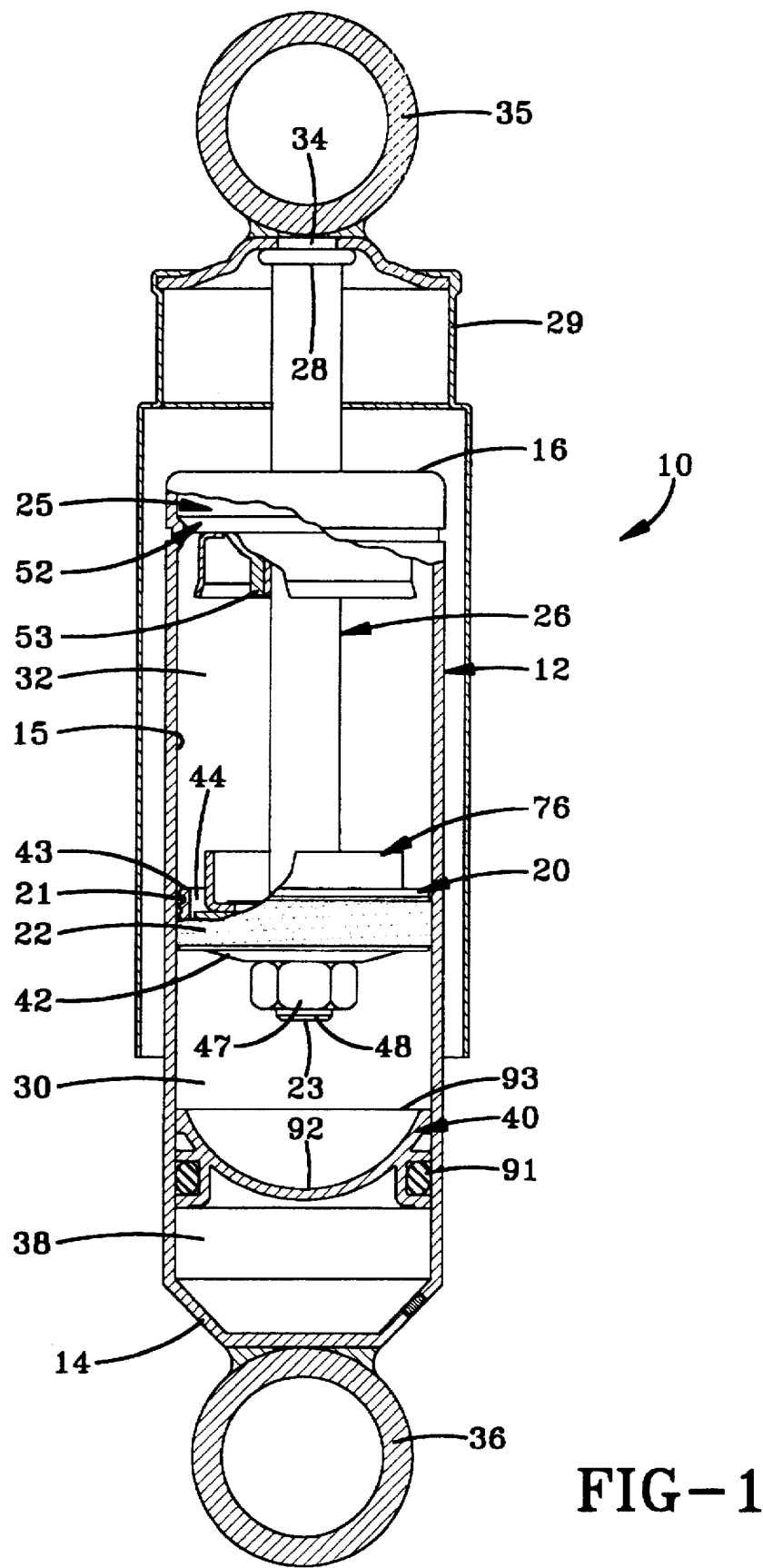
FIG. 1 is a cross sectional view of a suspension damper.

Referring to the drawings, illustrated in FIG. 1 is a suspension damper 10 of the monotube gas charged shock type. Damper 10 includes an elongated outer cylindrical tube 12 which is closed at its lower end 14. A piston assembly 20 is mounted for reciprocal movement within the tube 12. Piston assembly 20 includes a stamped steel piston body 21 which carries a band of low friction material 22 sealingly and slidably engaging the inner wall 15 of cylindrical tube 12. Piston assembly 20 hydraulically separates the tube 12 into two expansible and contractible working chambers designated as compression chamber 30 and extension chamber 32.

The upper end 16 of tube 12 is formed to securely carry a rod guide assembly 25. A piston rod 26 is securely connected to the piston assembly 20 and extends through extension chamber 32 and rod guide assembly 25 exiting the tube 12. Piston rod 26 includes an annular shoulder 28 that carries a generally cylindrical dust tube assembly 29 that extends down over the tube 12.

The upper end 34 of piston rod 26 includes an attachment fitting 35 which is provided for attachment to the body of a vehicle (not illustrated). The lower end 14 of cylinder tube 12 also includes an attachment fitting 36 for connection to the wheel assembly of the vehicle (not illustrated). Therefore, in response to relative movement between the wheel assembly and the vehicle, the piston assembly 20 reciprocally moves within tube 12.

The cylindrical tube 12 carries a supply of oil which provides a damping medium for the damper 10. During a compression stroke, as the piston assembly 20 slides downward in the tube 12, an increasing volumetric mount of the piston rod 26 enters the tube 12 through the rod guide assembly 25. Therefore, a means of accommodating this increased volume within the damper 10 must be provided. Accordingly, a compressible gas charge is carried within compensation chamber 38 which is separated from the compression chamber 30 by a reciprocal gas cup assembly 40.

As the increasing amount of the piston rod 26 enters the tube 12 during a compression stroke of the damper 10, the gas within compensation chamber 38 is compressed as the gas cup assembly 40 slides downward in response to displacement of the noncompressible hydraulic fluid carried within compression chamber 30 and extension chamber 32. A conventional means of introducing a gas charge into the compensation chamber 38 is provided near the lower end 14 of tube 12.

Figure 2:
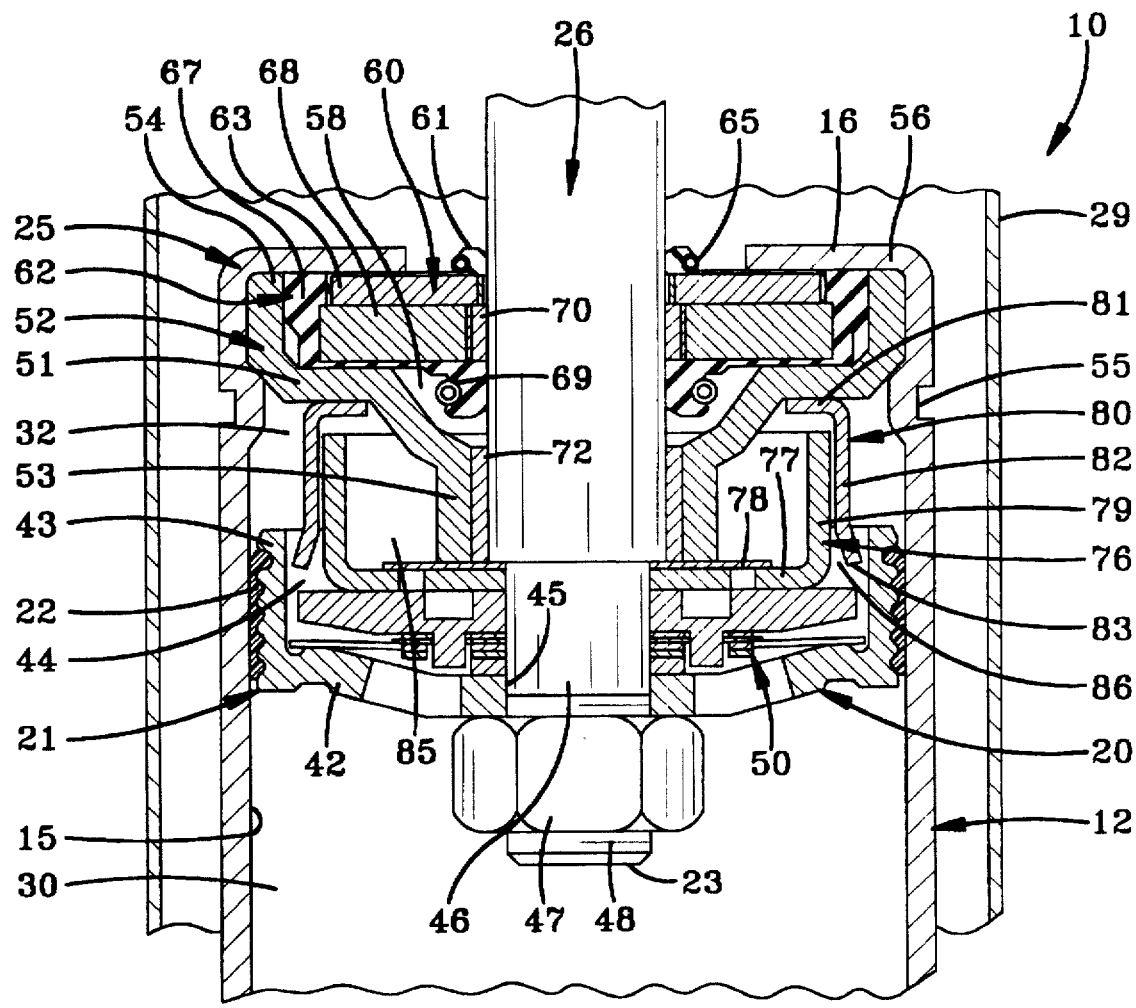
FIG. 2 is a fragmentary cross sectional view of the rod guide and piston assemblies of the suspension damper of FIG. 1 shown in a full extension position.

Referring to FIG. 2, the piston assembly 20 and the rod guide assembly 25 are shown in greater detail with the damper 10 in its fully extended position. The piston body 21 includes a base 42 and an annular skirt 43 forming an annular cavity 44 that is open to the extension chamber 32. The base 42 includes an opening 45 that receives turned down section 46 of piston rod 26 and is secured thereon by a nut 47 which threadedly engages threaded section 48 of piston rod 26. A valve assembly 50 of the bi-directional, monodisc type is carried about turned down section 46 of piston rod 26 within annular cavity 44 of piston assembly 20.

The rod guide assembly 25 includes a stamped metal rod guide body 52 which includes a lower annular leg forming a hub 53. Hub 53 surrounds piston rod 26. An upper annular skirt 54 is offset outwardly in the upward direction and positioned against the upper end 16 of tube 12 between rolled groove 55 and annular leg 56. This results in a piloting effect from the alignment of piston rod 26 by the lower bushing 72 and upper bushing 70 minimizing internal friction in the damper 10.

Closure of the damper 10 is achieved by simultaneously roll forming the radial groove 55 and forming over the upper end 16 by spinning or rolling the annular leg 56 substantially normal to the main portion of tube 12 and over the rod guide assembly 25. Formation of the radial groove 55 and the closure of the upper end 16 is critical and is therefore, conducted in the same machine resulting in aligned closure of the damper 10 and secure sealing thereof.

A cavity 58 is formed about piston rod 26 near the upper end 16 of tube 12 between rod guide body 52 and annular leg 56 of tube 12. The cavity 58 carries a first seal assembly 60 and a second seal assembly 62 which are secured between annular leg 56 of tube 12 and ledge 51 of rod guide body 52.

The outer seal assembly 60 includes an annular resilient seal element 61 which is carried by seal retainer 63 with a garter spring 65 biasing the seal element 61 against the piston rod 26. The inner seal assembly 62 includes a resilient seal element 67 which is carried by a seal retainer 68 and is biased against the piston rod 26 by a garter spring 69.

Upper bushing 70 and lower bushing 72 are disposed in the rod guide assembly 25 in a spaced apart manner to provide an additional degree of lateral support to the piston rod 26 which maintains the piston rod 26 in an aligned orientation and assists in preventing the application of excessive lateral forces to the seal assemblies 60 and 62. The upper bushing 70 is carried against the piston rod 26 by the seal retainer 68. The lower bushing 72 is carried against the piston rod 26 by the hub 53 of rod guide body 52. By means of the downward extending annular leg carrying the hub 53 of the rod guide body 52 the lower bushing 72 is spaced a maximum practical distance from the upper bushing 70.

An integral hydraulic rebound cutoff feature is carried by the piston assembly 20 and the rod guide assembly 25. The piston assembly 20 carries lower rebound cutoff element 76 which includes an annular base wall 77 captured between bearing washer 78 and valve assembly 50 and an upward extending cylindrical wall 79. The rod guide assembly 25 carries upper rebound cutoff element 80 which includes an annular base wall 81 fixed to rod guide body 52 and an downward extending cylindrical wall 82 which includes a flared-out end 83.

The cylindrical wall 79 of lower rebound cutoff element 76 is matingly received within cylindrical wall 82 of upper rebound cutoff element 80 as the damper approaches a fully extended position. As this occurs, fluid trapped within cavity 85 is expelled through gap 86 between lower rebound cutoff element 76 and upper rebound cutoff element 80. Initially, the gap 86 is relatively large near the end 83 of upper rebound cutoff element 80 and as the lower rebound cutoff element 76 is further received within upper rebound cutoff element 80 the size of the gap 86 dishes. A fluid back pressure created in cavity 85 hydraulically slows travel of the damper 10 as it approaches a full rebound condition.

When the damper 10 reaches the full rebound condition, bearing washer 78 mechanically contacts hub 53 of rod guide body 52 positively limiting the extent of travel for the damper 10. The abruptness of this mechanical stop is softened by specifically tailoring the amount of gap provided between the lower rebound cutoff element 76 and the upper rebound cutoff element 80 which provides a hydraulic cushion.

The end 83 of upper rebound cutoff element 80 is received within the annular skirt 43 of piston assembly 20 and the hub 53 of rod guide assembly 25 is received within the lower rebound cutoff element 76. By providing the mating overlap of the piston assembly 20 with the rod guide assembly 25 extension of the damper 10 is maximized.

Figure 3:
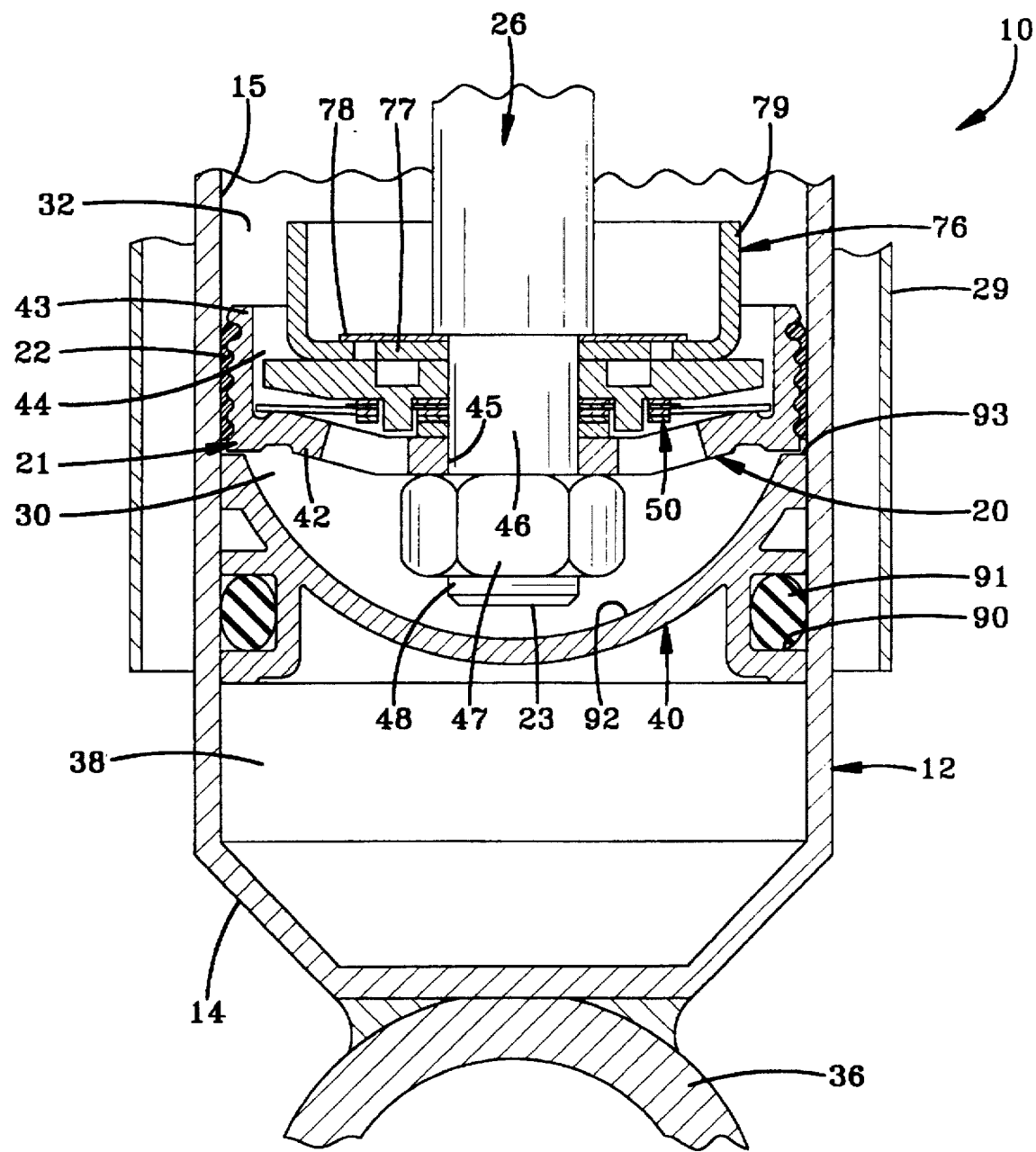
FIG. 3 is a fragmentary cross sectional view of the suspension damper of FIG. 1 shown in a full compression position.

Referring to FIG. 3, the damper 10 is illustrated in a full compression condition. The gas cup assembly 40 includes an annular groove 90 which carries a resilient seal 91 that contacts the inner wall 15 of tube 12 maintaining separation between the gas charge in compensation chamber 38 and the fluid carried in compression chamber 30. The gas cup assembly 40 also includes a cup element 92 which spans across the tube 12 and opens toward the compression chamber 30. The gas cup assembly 40 is designed to receive the lower end 23 of piston rod 26 within the cup element 92. The rim 93 of cup element 92 is engageable with the base 42 of piston assembly 20. The nut 47 is fully received within the cup element 92 so that the travel of the damper 10 in a compression direction is maximized.

In accordance with the foregoing description, a damper 10 of the monotube gas charged shock type provides a greater degree of travel per unit length. In addition, a piston rod 26 of a relatively smaller diameter is made possible due to the lateral support provided by the spaced apart upper bushing 70 and lower bushing 72.

We claim:

1. A monotube damper comprising:

a cylindrical tube;

a piston sealingly and slidably carried within the cylindrical tube, the piston separating the cylindrical tube into extension and compression chambers;

a piston rod connected to the piston and extending therefrom;

a rod guide assembly surrounding the piston rod and including a one piece rod guide body with a lower annular leg with a hub and an upper annular skirt;

a lower bushing supporting the piston rod and carried by the hub; and an upper bushing spaced away from the lower bushing, supporting the piston rod and carried within the upper annular skirt.

2. A monotube damper according to claim 1 wherein the cylindrical tube includes an upper end formed closed with an annular leg and a radial groove together capturing the rod guide assembly in an aligned orientation wherein the radial groove is rolled simultaneously while the upper end is formed closed with the annular leg.

3. A monotube damper comprising:

cylindrical tube:

a piston sealingly and slidably carried within the cylindrical tube, the piston separating the cylindrical tube into extension and compression chambers:

a piston rod connected to the piston and extending therefrom:

a rod guide assembly surrounding the piston rod and including a one piece rod guide body with a lower annular leg with a hub and an upper annular skirt:

a lower bushing supporting the piston rod and carried by the hub;

an upper bushing spaced away from the lower bushing, supporting the piston rod and carried within the upper annular skirt; and an outer seal assembly contacting the rod guide and positioned outside the upper bushing and an inner seal assembly contacting the rod and positioned inside the upper bushing;

wherein the cylindrical tube includes an upper end formed closed with an annular leg and a radial groove together capturing the rod guide assembly in an aligned orientation and wherein the damper includes a maximized active travel length due to a mating overlap of the rod guide assembly with the piston.

4. A monotube damper comprising:

a cylindrical tube;

a piston sealingly and slidably carried within the cylindrical tube including an annular skirt and a lower rebound cutoff element, the piston separating the cylindrical tube into extension and compression chambers;

a piston rod connected to the piston and extending therefrom; and a rod guide assembly surrounding the piston rod and including a lower annular leg with a hub and an upper rebound cutoff element wherein when the damper is in a fully extended position the lower annular leg is received within the lower rebound cutoff element the lower rebound cutoff element is received within the upper rebound cutoff element and the upper rebound cutoff element is received within the annular skirt of the piston.

5. A monotube damper according to claim 4 wherein when the damper is approaching the fully extended position a gap exists between the upper rebound cutoff element and the lower rebound cutoff element through which fluid is allowed to flow, the gap reducing in size as the damper further approaches the fully extended position.

6. A monotube damper according to claim 5 wherein the upper rebound cutoff element includes an annular configuration with a cylindrical wall having a first diameter and having a flared out lower end, the lower end having a second diameter larger than the first diameter.

7. A monotube damper according to claim 4 wherein the rod guide assembly includes a first bushing and a second bushing spaced apart from the first bushing wherein each bushing engages the piston rod and supplies lateral support to the piston rod.

8. A monotube damper according to claim 4 wherein the piston has a body that includes a base and an annular skirt together forming an annular cavity that is open to the extension chamber wherein the base is secured to the piston rod with a valve assembly carried about the piston rod within the annular cavity.

9. A monotube damper according to claim 8 wherein the piston is secured to the piston rod such that a portion of the piston rod extends through a piston base and into the compression chamber and further comprising a gas cup slidably and sealingly carried in the cylindrical tube separating a compensation chamber off from the compression chamber.

10. A monotube damper according to claim 9 wherein the gas cup includes a rim and a cup element that spans across the cylindrical tube and includes an opening adjacent the compression chamber that is capable of receiving the portion of the piston rod that extends through the piston base and into the compression chamber such that the piston base is engageable with the rim.

11. A monotube damper comprising:

a cylindrical tube;

a piston sealingly and slidably carried within the cylindrical tube including an annular skirt and a lower rebound cutoff element, the piston separating the cylindrical tube into extension and compression chambers;

a piston rod connected to the piston and extending therefrom;

a bearing washer positioned around the piston rod adjacent the lower rebound cutoff element; and a rod guide assembly surrounding the piston rod and including a lower annular leg with a hub and an upper rebound cutoff element wherein when the damper is in a fully extended position the lower annular leg is received within the lower rebound cutoff element, the lower rebound cutoff element is received within the upper rebound cutoff element, the upper rebound cutoff element is received within the annular skirt of the piston and the bearing washer is contactable with the lower annular leg providing a positive stop.

12. A monotube damper comprising:

a cylindrical tube;

a piston sealingly and slidably carried within the cylindrical tube including an annular skirt and a lower rebound cutoff element, the piston separating the cylindrical tube into extension and compression chambers;

a piston rod connected to the piston and extending therefrom; and a rod guide assembly surrounding the piston rod and including a one-piece rod guide body having a lower annular leg with a hub, and having an upper annular skirt offset outwardly and upwardly from the lower annular leg, and, the rod guide assembly including an upper rebound cutoff element, wherein when the damper is in a fully extended position the lower annular leg is received within the lower rebound cutoff element the lower rebound cutoff element is received within the upper rebound cutoff element and the upper rebound cutoff element is received within the annular skirt of the piston.

13. A monotube damper according to claim 12 wherein the upper rebound cutoff element includes an annular base wall fixed to the rod guide body and a downwardly extending cylindrical wall with a flared-out end.

14. A monotube damper according to claim 12 wherein the piston includes a bearing washer and a valve assembly, and wherein the lower rebound cutoff element includes an annular base wall captured between the bearing washer and the valve assembly, and wherein the lower rebound cutoff element includes an upward extending cylindrical wall.

15. A monotube damper according to claim 12 wherein the piston includes an annular cavity carrying a bi-directional monodisc valve assembly and a bearing washer wherein the lower rebound cutoff element is captured between the valve assembly and the bearing washer and wherein the bearing washer is contactable with the lower annular leg of the rod guide assembly to limit travel.

16. A monotube damper according to claim 12 further comprising a first seal assembly and a second seal assembly secured between an annular leg of the cylindrical tube and a ledge of the rod guide body, wherein the first and second seal assemblies carry resilient elements that are positioned on opposite sides of an upper bushing.

17. A monotube damper according to claim 16 further comprising a lower bushing carried by the lower annular leg and spaced away from the upper bushing.

18. A monotube damper according to claim 17 wherein the first seal assembly includes a first seal retainer, wherein the upper bushing is positioned concentrically inside the first seal retainer.

19. A monotube damper according to claim 18 wherein the second seal assembly includes a second seal retainer that extends further radially inward than the first seal retainer so that the upper annular bushing engages both the first and the second seal retainers.

* * * * *